United States Patent
Inoue et al.

(10) Patent No.: US 8,938,537 B2
(45) Date of Patent: Jan. 20, 2015

(54) CENTRAL CONTROL VERIFYING APPARATUS, CENTRAL CONTROL VERIFICATION PROGRAM, AND CENTRAL CONTROL VERIFYING METHOD

(75) Inventors: Hiroaki Inoue, Tokyo (JP); Masaharu Morimoto, Tokyo (JP); Kiyohisa Ichino, Tokyo (JP)

(73) Assignee: NEC Corporation, Tokyo (JP)

( * ) Notice: Subject to any disclaimer, the term of this patent is extended or adjusted under 35 U.S.C. 154(b) by 224 days.

(21) Appl. No.: 13/703,222

(22) PCT Filed: May 26, 2011

(86) PCT No.: PCT/JP2011/062086
§ 371 (c)(1),
(2), (4) Date: Dec. 10, 2012

(87) PCT Pub. No.: WO2011/158628
PCT Pub. Date: Dec. 22, 2011

(65) Prior Publication Data
US 2013/0311647 A1    Nov. 21, 2013

(30) Foreign Application Priority Data
Jun. 17, 2010 (JP) .................. 2010-138309

(51) Int. Cl.
*H04L 12/26* (2006.01)
*H04L 12/937* (2013.01)
(Continued)

(52) U.S. Cl.
CPC .............. *H04L 43/50* (2013.01); *H04L 49/254* (2013.01); *H04L 49/552* (2013.01); *H04L 49/00* (2013.01); *H04L 45/42* (2013.01)
USPC .......................................... 709/224; 709/244

(58) Field of Classification Search
CPC ..... H04L 49/254; H04L 49/00; H04L 49/552; H04L 43/50; H04L 45/42
USPC ......................................... 709/224, 223, 244
See application file for complete search history.

(56) References Cited

U.S. PATENT DOCUMENTS

| 8,639,783 B1 * | 1/2014 | Bakke et al. ............. 709/220 |
| 2009/0316694 A1 * | 12/2009 | Beshai ................... 370/357 |

(Continued)

FOREIGN PATENT DOCUMENTS

| JP | H11220487 A | 8/1999 |
| JP | 2008022379 A | 1/2008 |

(Continued)

OTHER PUBLICATIONS

The international search report for PCT/JP2011/062086 mailed on Jun. 21, 2011.

(Continued)

*Primary Examiner* — Kostas Katsikis
(74) *Attorney, Agent, or Firm* — Sughrue Mion, PLLC

(57) ABSTRACT

A central control verifying apparatus includes a plurality of quasi switches respectively corresponding to a plurality of switches in a network; a connection data managing section which manages connection data between the plurality of switches; and a verifying section. Each of the plurality of quasi switches is communicably connected with the network central control section through a control link. A requesting quasi switch of the plurality of quasi switch transmits a route setting request to the network central control section. A target quasi switch of the plurality of quasi switches receives the route indication data generated in response to the route setting request from the network central control section. The verifying section refers to the connection data and the route indication data received by the target quasi switch to verify whether or not a desired route setting is performed according to the route setting request by the network central control section.

7 Claims, 11 Drawing Sheets

(51) Int. Cl.
*H04L 12/939* (2013.01)
*H04L 12/931* (2013.01)
*H04L 12/717* (2013.01)

(56) References Cited

U.S. PATENT DOCUMENTS

2010/0257263 A1* 10/2010 Casado et al. ............... 709/223
2011/0231545 A1* 9/2011 Enomoto et al. ............ 709/224
2011/0264795 A1* 10/2011 Koide et al. .................. 709/224

FOREIGN PATENT DOCUMENTS

WO 0074313 A1 12/2000
WO WO 2010064532 A1 * 6/2010 ............ H04L 12/56

OTHER PUBLICATIONS

PCT International preliminary report on patentability for PCT/JP2011/062087.

* cited by examiner

Fig. 6

TPL: CONNECTION DATA

| START POINT | | END POINT | |
|---|---|---|---|
| SWITCH | PORT | SWITCH | PORT |
| 1 | 1 | 2 | 2 |
| 1 | 2 | 0 | 1 |
| ⋮ | ⋮ | ⋮ | ⋮ |

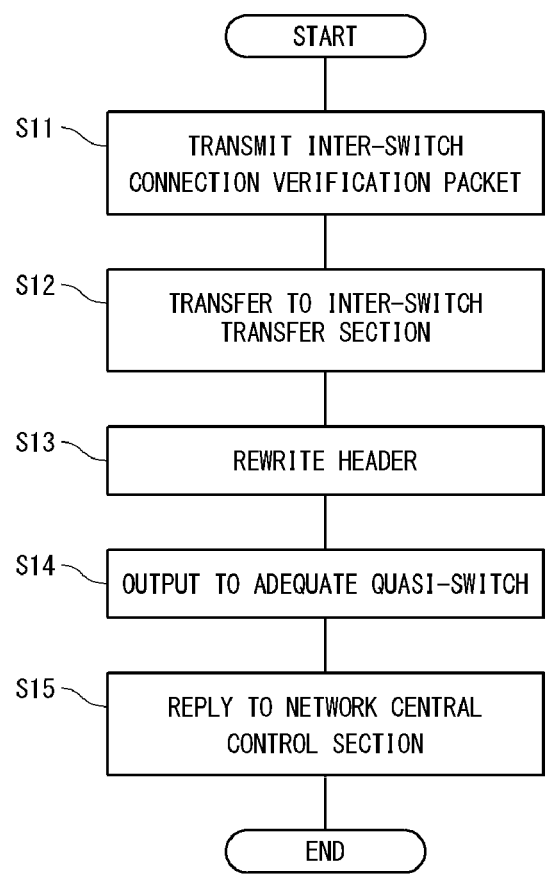

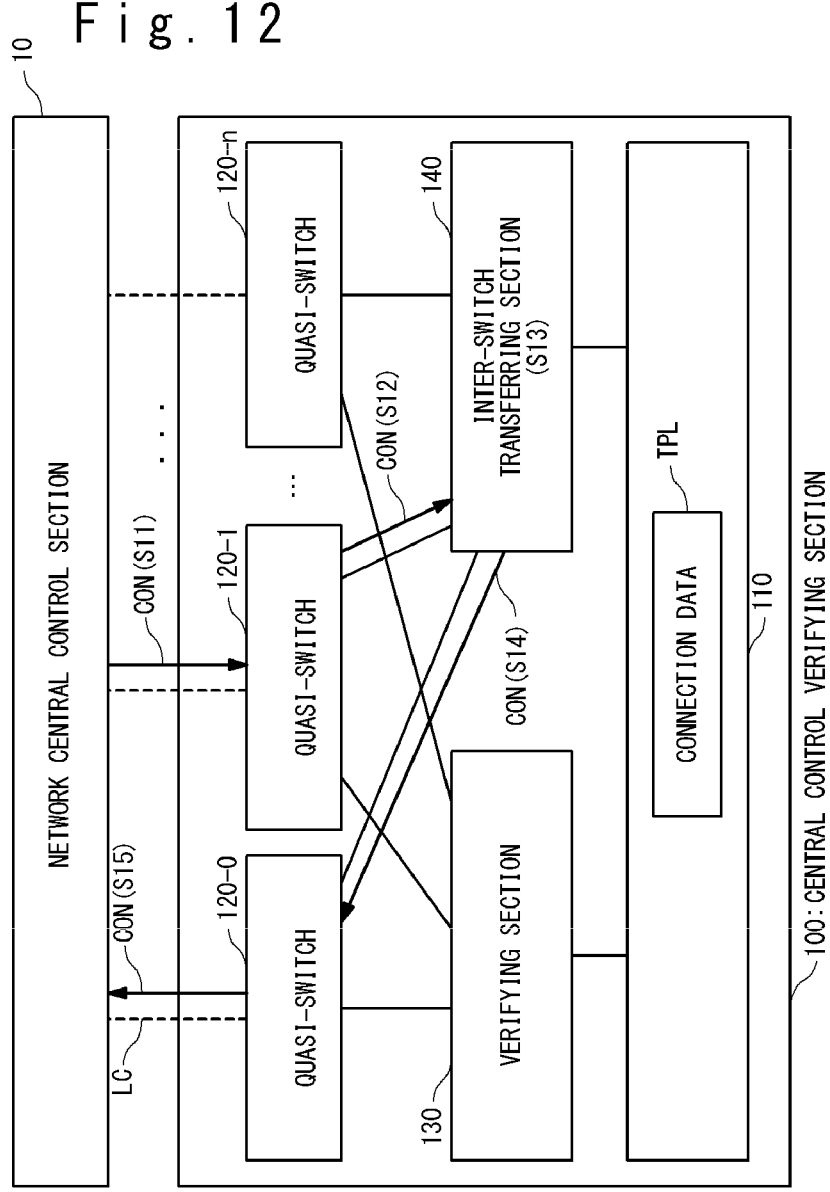

CENTRAL CONTROL VERIFYING APPARATUS, CENTRAL CONTROL VERIFICATION PROGRAM, AND CENTRAL CONTROL VERIFYING METHOD

This application is a National Stage Entry of PCT/JP2011/062086 filed May 26, 2011, which claims priority from Japanese Patent Application 2010-138309 filed Jun. 17, 2010, the contents of all of which are incorporated herein by reference, in their entirety.

TECHNICAL FIELD

The present invention relates to a network central control technique. The present invention relates, in particular, to a technique of verifying network central control in a network central control system.

BACKGROUND ART

In a system such as a data center, in which many computers are deployed, a network technique of efficiently connecting the computers is required. In such a system, a central control type network configuration is more preferable than a distribution control type network configuration such as the Internet. The central control type network system is hereinafter referred to as "network central control system". For example, the network central control system utilizing Openflow (refer to http://www.openflowswitch.org/) has been known.

FIG. 1 is a diagram schematically showing a configuration of a typical network central control system. The network central control system includes a network central control section 10 (management server) that manages and controls a network NET in a central manner. In the network NET, a plurality of switches 20 are arranged (for example, 20-0 to 20-4 are shown in this FIG.). The adjacent switches 20 are connected to each other through a link LN. The network central control section 10 is connected to each of the switches 20 through a control link LC.

Each of the switches 20 has a function of transferring a packet. For example, each of the switches 20 has a transfer table. The transfer table represents correspondence between flow identification data and packet transfer destination. The flow identification data includes, for example, packet header data and an input port. Each of the switches 20 can transfer the packet received from the input port to the transfer destination by referring to the transfer table.

The network central control section 10 has a function of determining and setting a packet transmission route in the network NET. It is assumed that one terminal starts to transmit a packet of a new flow. When a first packet reaches a first switch 20 (for example, switch 20-0), the switch 20-0 does not recognize the transfer destination of the received packet. Thus, the switch 20-0 (request source switch) transmits a route setting request REQ relating to the new flow to the network central control section 10 through the control link LC. In response to the route setting request REQ, the network central control section 10 determines (designs) the transmission route of the packet belonging to the new flow.

When the transmission route is determined, the network central control section 10 transmits route indication data INS to each of the switches 20 (target switches) on the determined transmission route through the control link LC. The route indication data INS is used to instruct the target switches 20 to transfer the packet belonging to the flow along the determined transmission route. The target switch 20 receives the route indication data INS and sets its transfer table according to the route indication data INS. After that, each of the switches 20 on the transmission route can transfer a packet belonging to the flow without making an inquiry to the network central control section 10.

In a case of Openflow, "Openflow Controller" corresponds to the network central control section 10, and "Openflow Switch" corresponds to the switch 20. By using "Secure Channel" of Openflow, the above-mentioned transfer table can be set.

Generally known techniques related to verification in the Internet are as follows.

Patent Literature 1 discloses a network quasi testing device. The quasi testing device receives verification data from a monitor that monitors a transmission route, and transmits the verification data to an actual device connected to the transmission route or a quasi device that represents the actual device in a quasi manner. The quasi testing device converts a destination address A for the verification data, which is destined for the actual device, into an address of the quasi device, to involve the destination address A before the conversion in the verification data. Then, the quasi testing device converts a source address for data returned from the quasi device into the original destination address A.

Patent Literature 2 discloses a quasi network switch testing device. The quasi network switch testing device includes a plurality of transmission/reception ports, a frame control section, a control frame generating section, and a data frame generating section. A plurality of tested devices are connected to the plurality of transmission/reception ports. The frame control section relays a frame between the plurality of transmission/reception ports. The control frame generating section generates a quasi control frame, and transmits the generated quasi control frame from the transmission/reception ports. The data frame generating section generates an arrival confirming data frame, and transmits the generated arrival confirming data frame from the transmission/reception ports.

CITATION LIST

Patent Literature 1: JP H11-220487A
Patent Literature 2: JP 2008-22379A

SUMMARY OF THE INVENTION

The inventor of the present application aimed at the following points. That is, in the network central control system as shown in FIG. 1, it is important to verify the central control processing which depends on a network central control section 10 in addition to the verification of a communication in a network NET. This is because the packet transmission inter-switch can not be carried out correctly when the processing by the network central control section 10 is improper. Therefore, it is desired to verify the central control processing by network central control section 10 and to guarantee the propriety.

At this time, it is desirable that the exhaustive verification of high load is performed. To perform the exhaustive verification of high load, it is necessary to transmit many route setting requests REQ to the network central control section 10 at an appropriate timing. For the purpose, it is necessary to transfer many packets between the switches 20 and to generate the situation that an optional switch 20 does not know the destination of the received packet, at the appropriate timing. That is, both of a high bandwidth among the switches 20 and the controllability (controllability) of each switch 20 are required.

However, the controllability of the switch 20 (the physical switch) which is used in the network central control system is low generally. It is possible to realize the switch 20 through software emulation to improve controllability. However, in the case, because the software processing becomes necessary, the forwarding bandwidth among switch 20 has declined than the case of the hardware processing.

One object of the present invention is to provide a technique which can verify central control by a network central control section in the exhaustive verification of high load.

In the view of the present invention, the central control verifying apparatus for verifying the central control of the network by the network central control section is provided. The central control verifying apparatus, which verifies central control of a network by a network central control section, includes: a plurality of quasi switches respectively corresponding to a plurality of switches in the network; a connection data managing section configured to manage connection data among the plurality of switches; and a verification section. Each of the plurality of quasi switches is communicably connected with the network central control section through a control link, and a requesting quasi switch of the plurality of quasi switches transmits a route setting request to the network central control section. A target quasi switch of the plurality of quasi switches receives route indication data generated in response to the route setting request from the network central control section, and the verifying section refers to the connection data and the route indication data received by the target quasi switch to verify whether or not a desired route setting is performed according to the route setting request by the network central control section.

In another view of the present invention, a non-transitory storage medium which stores a central control verification program to realize a central control verification function for verifying central control of a network by a network central control section on a computer is provided. The central control verification function includes: a plurality of quasi switches respectively corresponding to a plurality of switches in the network; a connection data managing section configured to manage connection data among the plurality of switches; and a verifying section. Each of the plurality of quasi switches is communicably connected with the network central control section through the control link, and a requesting quasi switch of the plurality of quasi switches transmits a route setting request to the network centralized control section. A target quasi switch of the plurality of quasi switches receives route indication data generated in response to the route setting request, from the network central control section, and the verifying section refers to the connection data and the route indication data received by the target quasi switch to verify whether or not a desired route setting is performed according to the route setting request by the network central control section.

In another view of the present invention, a network central control system is provided. A network central control system includes: a network central control section configured to carry out central control of a network; and a central control verifying section configured to verify the central control by the network central control section. The central control verifying section includes: a plurality of quasi switches respectively corresponding to a plurality of switches in the network; a connection data managing section configured to manage connection data among the plurality of switches; and a verifying section. Each of the plurality of quasi switches is communicably connected with the network central control section through a control link, and a requesting quasi switch of the plurality of quasi switches transmits a route setting request to the network central control section. The network central control section transmits route indication data to a target quasi switch of the plurality of quasi switches in response to the route setting request. The verifying section refers to the connection data and the route indication data received by the target quasi switch to verify whether or not a desired route setting according to the route setting request by the network central control section.

In another view of the present invention, a method of verifying central control of a network by a network central control section, is provided. The central control verifying method includes:

(A) providing a plurality of quasi switches respectively corresponding to a plurality of switches in the network, wherein each of the plurality of quasi switches is communicably connected with the network central control section through a control link;

(B) transmitting a route setting request from a requesting quasi switch of the plurality of quasi switches to the network central control section;

(C) transmitting route indication data from the network central control section to a target quasi switch of the plurality of quasi switches in response to the route setting request; and (D) referring to connection data between the plurality of switches and the route indication data received by the target quasi switch to verify whether or not a desired route setting according to the route setting request by the network central control section.

According to the present invention, the central control processing by the network central control section can be verified in the exhaustive verification of high load.

BRIEF DESCRIPTION OF THE DRAWINGS

The above and other objects, advantages, and features will be more apparent from exemplary embodiments of the present invention described with reference to the following drawings:

FIG. 6 is a conceptual view showing an example of connection data according to the exemplary embodiment of the present invention;

FIG. 11 is a flow chart showing inter-switch packet transfer processing according to the exemplary embodiment of the present invention; and FIG. 12 is a block diagram showing an example of the inter-switch packet transfer processing according to the exemplary embodiment of the present invention.

DESCRIPTION OF EXEMPLARY EMBODIMENTS

Hereinafter, exemplary embodiments of the present invention will be described with reference to the attached drawings.

1. Configuration

Figure 1:
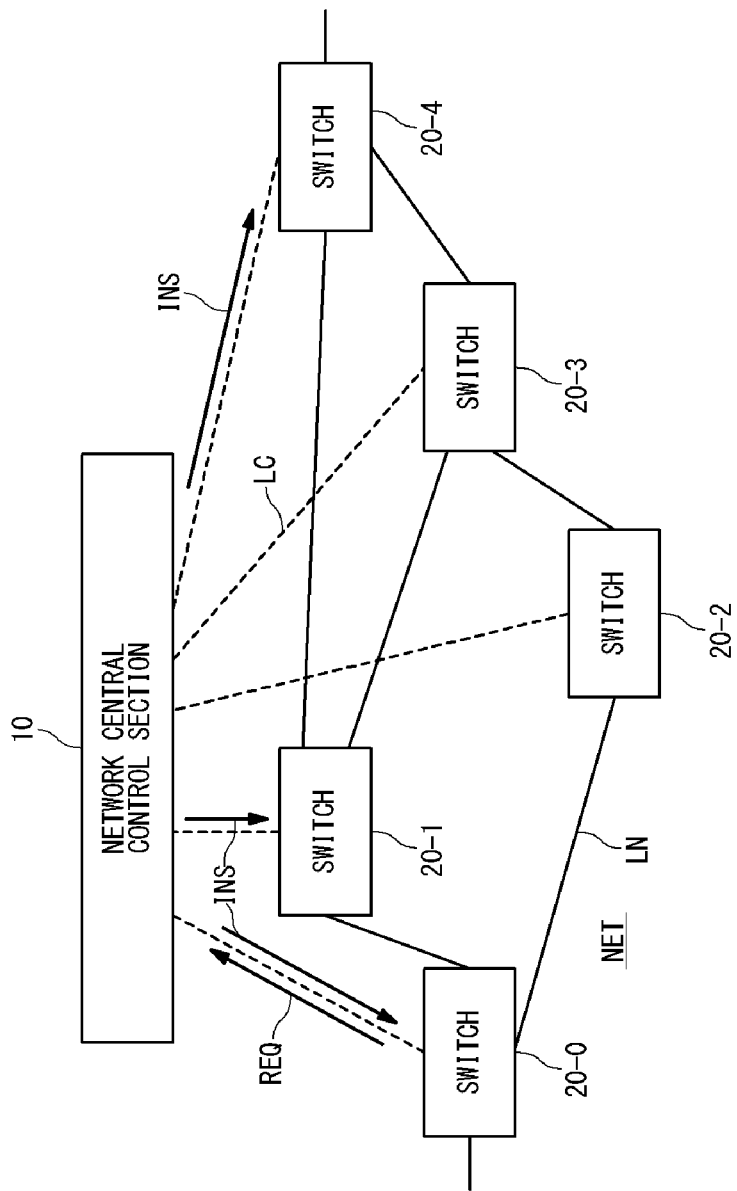
FIG. 1 is a diagram schematically showing a configuration of a typical network central control system.
Figure 2:
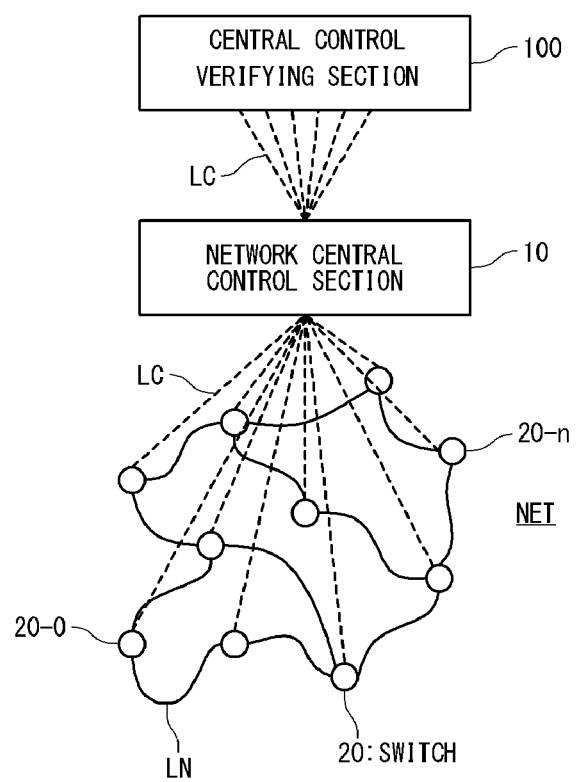
FIG. 2 a diagram schematically showing a configuration of a network central control system in accordance with an exemplary embodiment of the present invention.

FIG. 2 is a diagram schematically showing a configuration of a network central control system 1 according to an exemplary embodiment of the present invention. The network central control system 1 includes a network central control section 10 that manages and controls a network NET in a central manner. A plurality of switches 20-0 to 20-$n$ are arranged in the network NET. The adjacent switches 20 are connected to each other through a link LN. The network central control section 10 is connected to each of the switches 20 through a control link LC.

Figure 3:
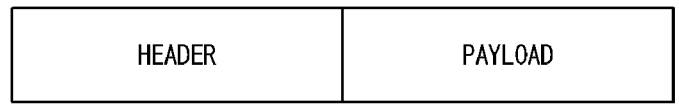
FIG. 3 is a conceptual view showing a format of a transmission packet transmitted between switches.
Figure 4:
FIG. 4 is a conceptual view showing a format of a control packet used in a control link between a network central control section and each switch.

FIG. 3 is a diagram conceptually showing the format of a transmission packet PKT transmitted between the switches 20. Like a general packet transmitted on the Internet, the transmission packet PKT is composed of a header and a payload. On the other hand, FIG. 4 conceptually shows the format of a particular control packet PKT-C used in the control link LC between the network central control section 10 and the switches 20. The control packet PKT-C includes a control header and a payload. The transmission packet PKT can be contained in the payload of the control packet PKT-C. The packet formats are not limited to those shown in FIGS. 3 and 4, and may be any format as long as it conforms to specifications of the network central control system 1.

Each of the switches 20 has a function of transferring the packet PKT. For example, each of the switches 20 has a transfer table. The transfer table represents correspondence between flow identification data and packet transfer destination. The flow identification data includes, for example, packet header data and data of an input port. Each of the switches 20 can transfer the packet PKT received from the input port to the transfer destination by referring to the transfer table.

Typically, the network central control section 10 is provided in a management server. The network central control section 10 has a function of determining and setting a transmission route of the packet PKT in the network NET.

It is assumed that one terminal starts to transmit a packet PKT in a new flow. When a first packet PKT reaches a first switch 20 (for example, switch 20-0), the switch 20-0 does not recognize a transfer destination of the received packet PKT. Thus, the switch 20-0 (requesting switch) generates a route setting request REQ relating to the new flow. The route setting request REQ is a kind of the control packet PKT-C (refer to FIG. 4), and requests the network central control section 10 to set a route. The received packet PKT is stored in the payload of the route setting request REQ. Then, the requesting switch 20-0 transmits the route setting request REQ to the network central control section 10 through the control link LC.

In response to the route setting request REQ, the network central control section 10 determines (designs) the transmission route of the packet belonging to the new flow. When the transmission route is determined, the network central control section 10 transmits route indication data INS to each of the switches 20 (target switch) on the determined transmission route through the control link LC. The route indication data INS is a kind of the control packet PKT-C (refer to FIG. 4), and instructs the target switches 20 to transfer the packet belonging to the flow along the determined transmission route.

The target switch 20 receives the route indication data INS and sets its transfer table according to the route indication data INS. After that, each of the switches 20 on the transmission route can transfer packets PKT belonging to the flow without making an inquiry to the network central control section 10.

In a case of Openflow, "Openflow Controller" corresponds to the network central control section 10, and "Openflow Switch" corresponds to the switch 20. By using "Secure Channel" of Openflow, the above-mentioned transfer table can be set.

As shown in FIG. 2, the network central control system 1 according to the present exemplary embodiment further includes a central control verifying section 100. The central control verifying section 100 has a function of verifying central control of the network central control section 10, and operates as necessary. The central control verifying section 100 (central control verifying function) is realized by execution of software by a computer. The central control verifying section 100 together with the network central control section 10 may be incorporated into the management server.

Figure 5:
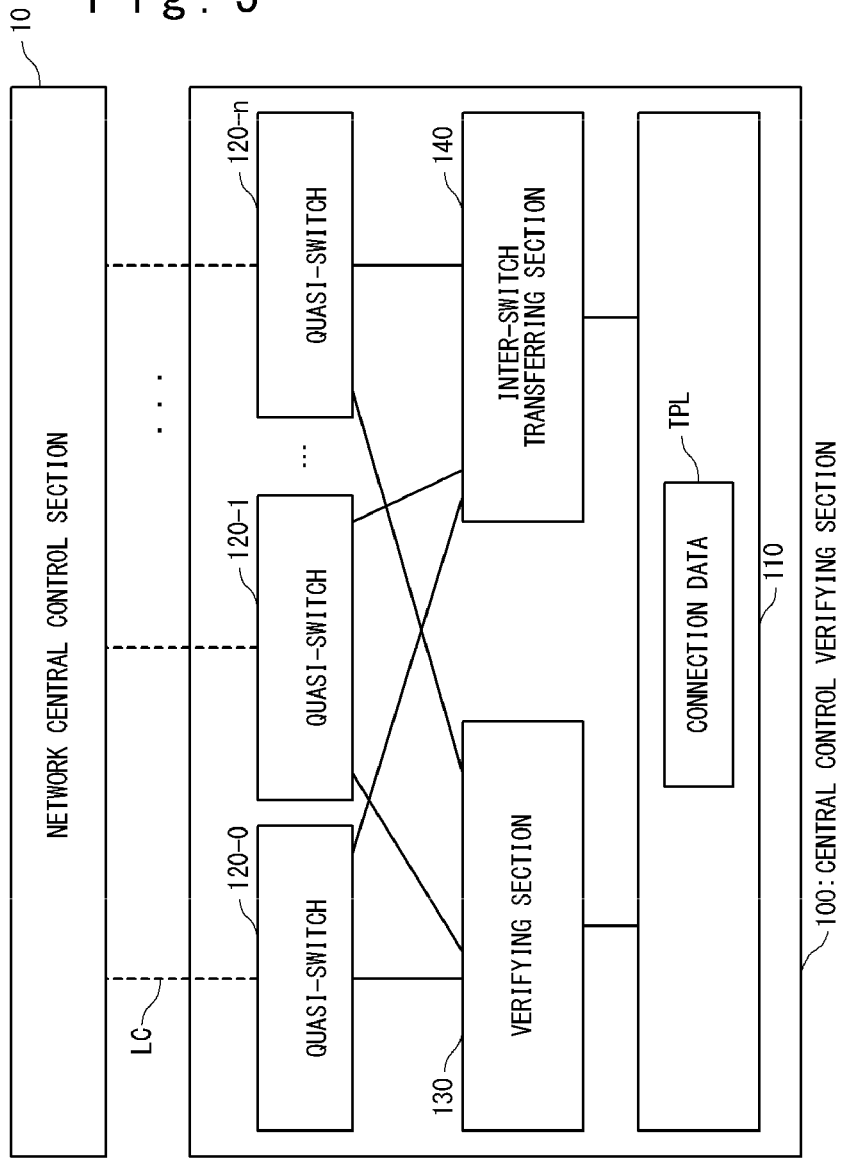
FIG. 5 is a block diagram showing a functional configuration of a central control verifying section according to the exemplary embodiment of the present invention.

FIG. 5 is a block diagram showing a functional configuration of the central control verifying section 100 according to the present exemplary embodiment. The central control verifying section 100 includes a connection data managing section 110, a plurality of quasi switches 120-0 to 120-$n$, a verifying section 130, and an inter-switch transferring section 140.

The connection data managing section 110 holds and manages connection data TPL. The connection data TPL represents connection relationship (topology) among the plurality of switches 20-0 to 20-$n$ in the network NET shown in FIG. 2. Examples of typical topology include ring, fat tree, and hyper cube. FIG. 6 shows an example of the connection data TPL. In FIG. 6, the connection data TPL has a plurality of entries each corresponding to the link LN between the switches 20. Each of the entries represents a port of a start point switch and a port of an end point switch of the link LN. For example, a port 2 of the switch 20-1 is connected to a port 1 of the switch 20-0.

The quasi switches 120 approximate the switches 20. The plurality of quasi switches 120-0 to 120-$n$ correspond to the plurality of switches 20-0 to 20-$n$, respectively. That is, the quasi switches 120-0 to 120-$n$ appear as the switches 20-0 to 20-$n$ from the network central control section 10, respectively. As shown in FIG. 5, the quasi switches 120-0 to 120-$n$ are communicably connected to the network central control section 10 through the control link LC.

Each of the quasi switches 120 has a function of transmitting the route setting request REQ to the network central control section 10 through the control link LC. Each of the quasi switches 120 has a function of receiving the route indication data INS and an inter-switch connection verification packet CON (to be described later) through the control link LC. Further, each of the quasi switches 120 has a function of transferring the received route indication data INS to the verifying section 130. Further, each of the quasi switches 120 has a function of transferring the received inter-switch connection verification packet CON to the inter-switch transferring section 140. However, unlike the normal switches 20, each of the quasi switches 120 does not have an inter-switch packet transfer function. That is, each of the quasi switches 120 does not have a function of directly transferring the packet PKT to another quasi switch 120. On the other hand, each of the quasi switches 120 can transfer the route setting request REQ to the network central control section 10 at any timing.

Details of the verifying section 130 and the inter-switch transferring section 140 will be described later.

Figure 7:
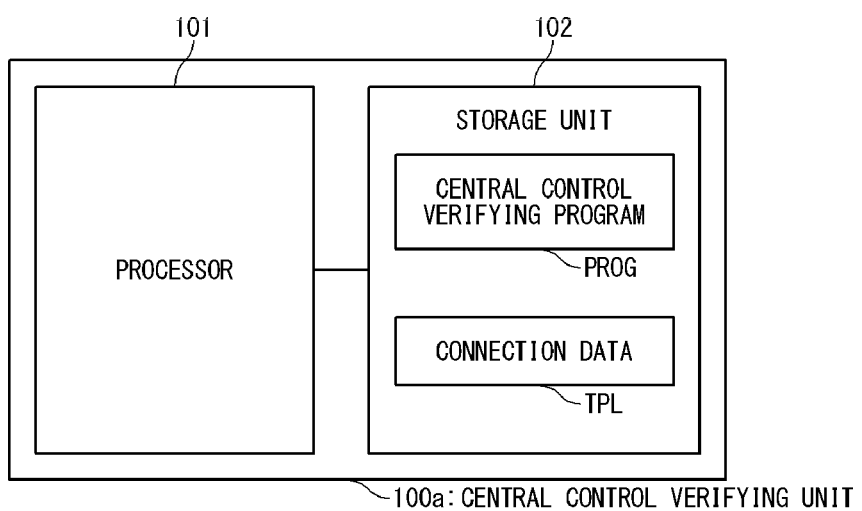
FIG. 7 is a block diagram showing a hardware configuration of a central control verifying apparatus according to the exemplary embodiment of the present invention.

FIG. 7 is a block diagram showing a hardware configuration of a central control verifying unit 100a according to the present exemplary embodiment. The central control verifying unit 100a has a function corresponding to that of the central control verifying section 100 shown in FIG. 5. Describing in detail, the central control verifying unit 100a includes a processor 101 and a storage unit 102. The processor 101 includes a Central Processing Unit (CPU). The storage unit 102 includes a Random Access Memory (RAM) and a Hard Disk Drive (HDD). The storage unit 102 stores the connection data TPL and a central control verification program PROG therein.

The central control verification program PROG is a software program executed by a computer (processor 101). The central control verification program PROG may be recorded in a computer-readable recording medium. The processor 101 executes the central control verification program PROG, thereby realizing the central control verifying section 100 according to the present exemplary embodiment.

The central control verifying unit 100a shown in FIG. 7 may be the same as the management server including the network central control section 10 or may be another unit.

2. Operation 2-1. Central Control Verification Processing

Figure 8:
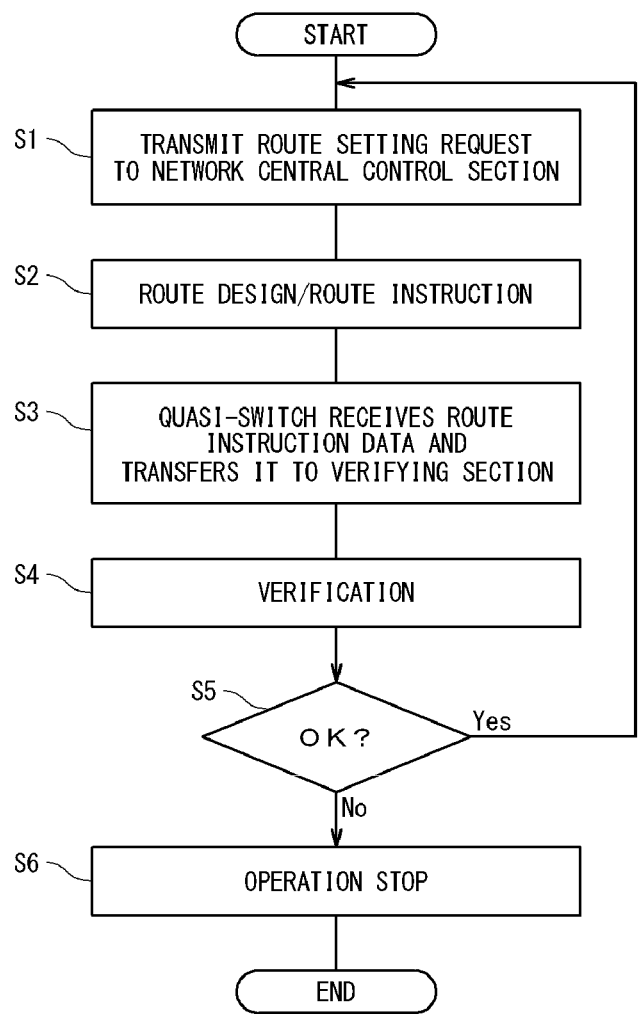
FIG. 8 is a flow chart showing central control verification processing according to the exemplary embodiment of the present invention.

Referring to a flow chart of FIG. 8 and block diagrams of FIG. 9 and FIG. 10, central control verification processing according to the present exemplary embodiment will be described.

Step S1:

A certain quasi switch 120 among the plurality of quasi switches 120-0 to 120-n transmits the route setting request REQ to the network central control section 10. The quasi switch 120 that transmits the route setting request REQ is hereinafter referred to as a "requesting quasi switch". For example, in FIG. 9 and FIG. 10, the quasi switch 120-1 is the requesting quasi switch.

Step S2:

When receiving the route setting request REQ, the network central control section 10 designs a route in response to the route setting request REQ. That is, the network central control section 10 determines (designs) the transmission route of a packet belonging to the flow designated according to the route setting request REQ. The quasi switches 120 that exist on the determined transmission route are hereinafter referred to as "target quasi switches". The network central control section 10 generates the route indication data INS for each of the target quasi switches, and transmits the route indication data INS to each of the target quasi switches. In an example shown in FIG. 9, the target quasi switches include the quasi switches 120-1 and 120-n. In an example shown in FIG. 10, the target quasi switches include the quasi switches 120-0, 120-1, and 120-n.

Step S3:

Each of the target quasi switches receives the route indication data INS from the network central control section 10, and transfers the received route indication data INS to the verifying section 130.

Step S4:

The verifying section 130 receives the route indication data INS from each of the target quasi switches. Then, referring to the received route indication data INS and the above-mentioned connection data TPL, the verifying section 130 verifies whether or not route setting by the network central control section 10 is correct. That is, the verifying section 130 verifies whether or not desired route setting in response to the route setting request REQ at Step S1 is performed by the network central control section 10. Examples of the verification may include: (1) Is the route interrupted on the way?; (2) Is the transmission packet PKT correctly transmitted to the destination?; and (3) Is the route indication data INS transmitted to extra quasi switches?

Figure 9:
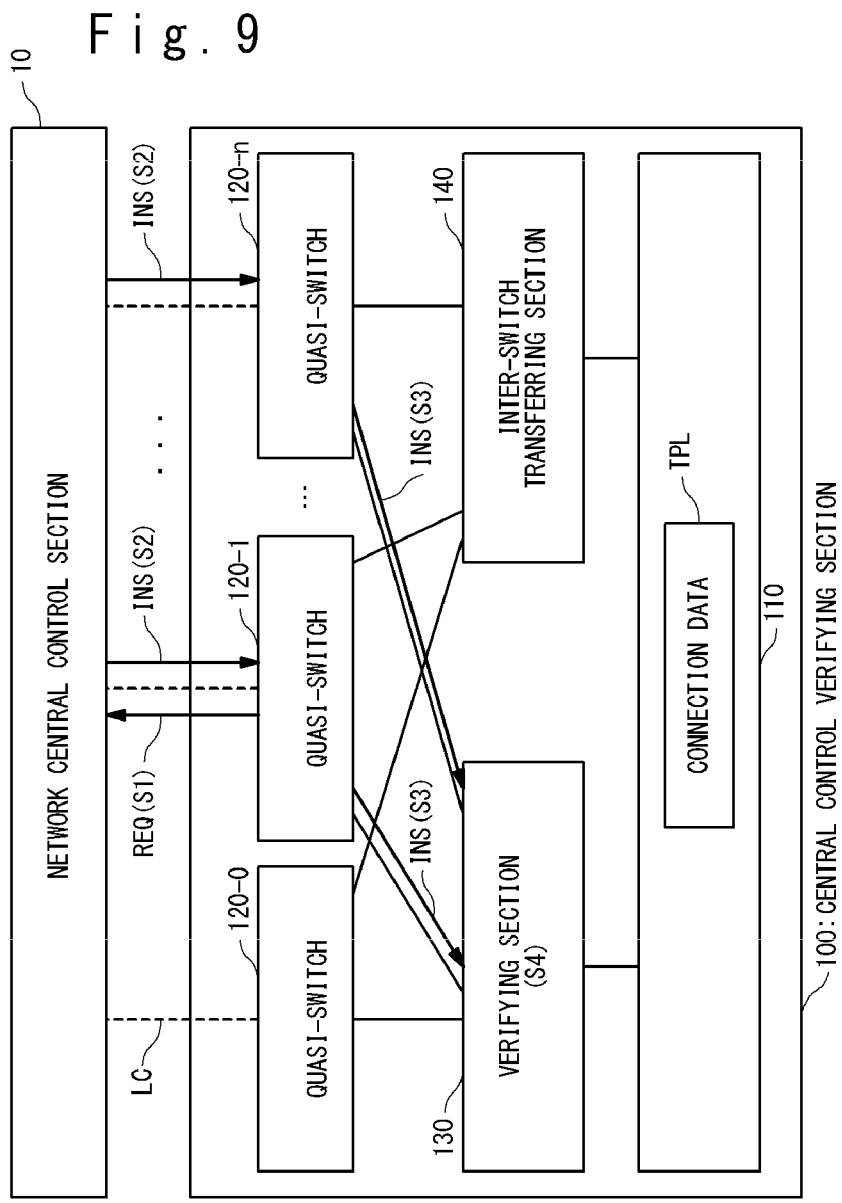
FIG. 9 is a block diagram showing an example of the central control verification processing according to the exemplary embodiment of the present invention.

FIG. 9 shows a case where a verification result is OK (Step S5; Yes). In this case where the verification result is OK, a control flow returns to Step S1. Then, similar processing is repeated.

Figure 10:
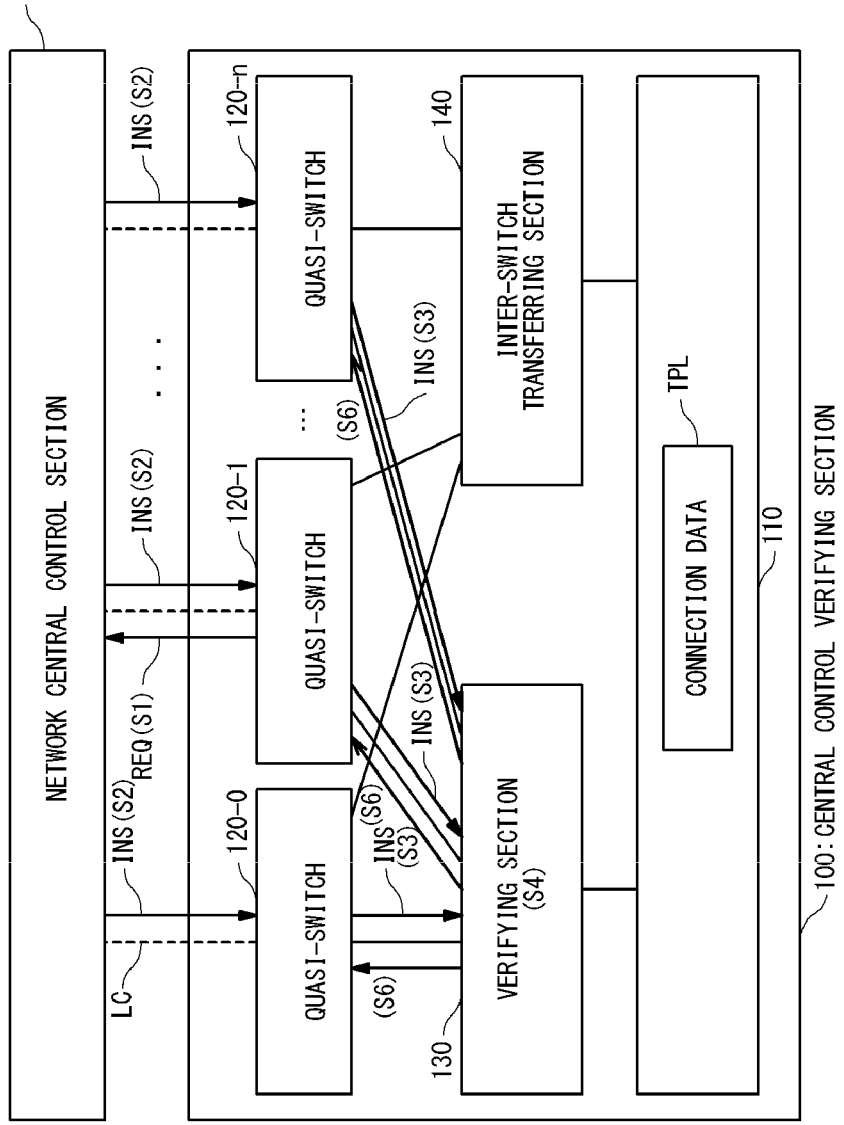
FIG. 10 is a block diagram showing another example of the central control verification processing according to the exemplary embodiment of the present invention.

FIG. 10 shows an example of a case where the verification result is NG (Step S5; No). As an example, the route indication data INS is transmitted to the undesired quasi switch 120-0. In this case where the verification result is NG (Step S5; No), the verifying section 130 transmits an operation stop command to all of the quasi switches 120-0 to 1 20-n to stop operation (Step S6).

As has been described, in the present exemplary embodiment, by using the quasi switches 120, the route setting request REQ can be transmitted to the network central control section 10 at any timing. That is, controllability is improved, and verification quality can be improved. Further, by monitoring the route indication data INS transmitted from the network central control section 10 in response to the route setting request REQ, it can be verified whether or not route setting is correctly performed. At this time, it is no need to transfer the packet PKT between the quasi switches 120. That is, by sequentially transmitting the route setting request REQ from the quasi switches 120 to the network central control section 10 without performing packet transfer, high-load and exhaustive verification can be achieved.

In the present exemplary embodiment, verification is performed by monitoring the route indication data INS transmitted from the network central control section 10 in response to the route setting request REQ. Thus, a method of actually transmitting the transmission packet PKT and performing verification based on whether or not the transmission packet PKT correctly arrives at the designated destination is not necessary. That is, in the present exemplary embodiment, verification is performed in units of the route setting requests REQ, and failure can be found at occurrence of a problem. This improves verification quality.

2-2. Inter-Switch Packet Transfer

The control packet PKT-C transmitted from the network central control section 10 to the switches 20 is not limited to the above-mentioned route indication data INS. Some control packets PKT-C should be transferred between the switches 20. An example thereof includes the "inter-switch connection verification packet CON" used to monitor whether or not the link LN between the switches 20 is alive. The inter-switch connection verification packet CON transmitted from the network central control section 10 to the network NET is transferred between the switches 20 through the link LN to be verified and then, is returned to the network central control section 10. When the inter-switch connection verification packet CON is not received within a predetermined period after transmission of the inter-switch connection verification packet CON, the network central control section 10 can determine that a failure occurs in the link LN to be verified.

The central control verifying section 100 according to the present exemplary embodiment also supports the inter-switch connection verification packet CON outputted from the network central control section 10. However, each of the quasi switches 120 does not have a function of directly transferring a packet to another quasi switch 120. For this reason, the central control verifying section 100 is provided with the inter-switch transferring section 140. The inter-switch transferring section 140 can cope with the inter-switch connection verification packet CON.

Referring to a flow chart of FIG. 11 and a block diagram of FIG. 12, inter-switch packet transfer processing according to the present exemplary embodiment will be described. Here, the inter-switch connection verification packet CON for verifying the link LN connecting the switch 20-1 to the switch 20-0 is considered as an example. The switches 20-1, 20-0 correspond to the quasi switches 120-1, 120-0, respectively.

Step S11:

The network central control section 10 generates the inter-switch connection verification packet CON for verifying the link LN connecting the switch 20-1 to the switch 20-0. For example, the inter-switch connection verification packet CON requests that it is outputted from the "port 2 of the switch 20-1" to the link LN to be verified. The network central control section 10 transmits the inter-switch connection verification packet CON to the quasi switches 120-1.

Step S12:

The quasi switch 120-1 receives the inter-switch connection verification packet CON from the network central control section 10. In this case, the quasi switch 120-1 transfers the inter-switch connection verification packet CON to the inter-switch transferring section 140.

Step S13:

When receiving the inter-switch connection verification packet CON, the inter-switch transferring section 140 analyzes the control header of the inter-switch connection verification packet CON. As a result, the inter-switch transferring section 140 recognizes that outputting of the inter-switch connection verification packet CON from the "port 2 of the switch 20-1" is requested. Referring to the connection data TPL, the inter-switch transferring section 140 recognizes the port connected to the "port 2 of the switch 20-1". For example, in a case of the connection data TPL shown in FIG. 6, it is found that the "port 1 of the switch 20-0" is connected to the "port 2 of the switch 20-1". Thus, the inter-switch transferring section 140 rewrites the control header of the inter-switch connection verification packet CON as if the inter-switch connection verification packet CON is inputted from the "port 1 of the switch 20-0". That is, the inter-switch transferring section 140 approximates as if the inter-switch connection verification packet CON is actually transferred from the switch 20-1 to the switch 20-0. It is no need to change the payload of the inter-switch connection verification packet CON.

Step S14:

The inter-switch transferring section 140 outputs the inter-switch connection verification packet CON having the rewritten header data to the quasi switches 120-0 corresponding to the switch 20-0.

Step S15:

The quasi switch 120-0 transmits the received inter-switch connection verification packet CON to the network central control section 100.

As described above, in the present exemplary embodiment, the inter-switch transferring section 140 directly rewrites the packet header data to approximate as if the packet is actually transferred between the switches 20. Since the packet does not need to be actually transferred between the switches 20, a response can be rapidly returned to the network central control section 100. Accordingly, it is very light load.

3. Summary

According to the present exemplary embodiment, by using the quasi switches 120, the route setting request REQ can be transmitted to the network central control section 10 at any timing. That is, controllability is improved, and verification quality can be improved. Further, by monitoring the route indication data INS transmitted from the network central control section 10 in response to the route setting request REQ, it can be verified whether or not route setting is correctly performed. At this time, it is no need to transfer the packet PKT between the quasi switches 120. That is, by sequentially transmitting the route setting request REQ from the quasi switches 120 to the network central control section 10 without performing packet transfer, high load and exhaustive verification can be achieved.

According to the present exemplary embodiment, verification is performed by monitoring the route indication data INS transmitted from the network central control section 10 in response to the route setting request REQ. Thus, the method of actually transmitting the transmission packet PKT and performing verification based on whether or not the transmission packet PKT correctly arrives at the designated destination is not necessary. That is, according to the present exemplary embodiment, verification is performed in units of the route setting requests REQ, and failure can be found at occurrence of a problem. This improves verification quality.

In the present exemplary embodiment, through high-load and exhaustive verification, the high-quality network central control section 10 can be realized. Moreover, by applying verification conditions at high load together with a performance analysis tool, performance bottleneck of the network central control section 10 can be analyzed.

The exemplary embodiment of the present invention has been described with reference to the attached drawings. However, the present invention is not limited to the above-mentioned exemplary embodiment, and may be appropriately modified by those skilled in the art so as not to depart from the subject matter.

A part or all of the above-mentioned exemplary embodiment can be stated as in the following supplementary notes, but is not limited to them.

(Supplementary Note 1)

A central control verification apparatus for verifying network central control by a network central control section, includes:

a plurality of quasi switches respectively corresponding to a plurality of switches in the network;

a connection data managing section configured to control connection data between the plurality of switches; and a verifying section, wherein each of the plurality of quasi switches is communicably connected to the network central control section through a control link, wherein a requesting quasi switch among the plurality of quasi switches transmits a route setting request to the network central control section, wherein a target quasi switch among the plurality of quasi switches receives route indication data generated in response to the route setting request from the network central control section, and wherein the verifying section verifies whether or not the network central control section has performed desired route setting according to the route setting request, referring to the connection data and the route indication data received by the target quasi switch.

(Supplementary Note 2)

The central control verification apparatus according to supplementary note 1, wherein, when the desired route setting is not performed, the verifying section stops operations of the plurality of quasi switches.

(Supplementary Note 3)

The central control verification apparatus according to supplementary note 1 or 2, wherein each of the plurality of quasi switches does not have a function of directly transferring a packet to another quasi switch.

(Supplementary Note 4)

The central control verification apparatus according to supplementary note 3, further includes a inter-switch transferring section, wherein the plurality of quasi switches include a first quasi switch corresponding to a first switch among the plurality of switches; and a second quasi switch corresponding to a second switch among the plurality of switches, wherein the network central control section transmits an inter-switch connection verification packet for verifying connection between the first switch and the second switch to the first quasi switch, wherein the first quasi switch transfers the inter-switch connection verification packet to the inter-switch transferring section, wherein by referring to the connection data, the inter-switch transferring section rewrites header data of the inter-switch connection verification packet, and outputs the inter-switch connection verification packet to the second quasi switch, and wherein the second quasi switch transmits the inter-switch connection verification packet to the network central control section.

(Supplementary Note 5)

A central control verification program realizing a central control verification function on a computer, a central control verification function of verifying network central control by a network central control section, wherein the central control verification function includes:

a plurality of quasi switches respectively corresponding to a plurality of switches in a network;

a connection data managing section configured to manage connection data between the plurality of switches; and a verifying section;

wherein each of the plurality of quasi switches is communicably connected to the network central control section through a control link, wherein a requesting quasi switch among the plurality of quasi switches transmits a route setting request to the network central control section, a target quasi switch among the plurality of quasi switches receives route indication data generated in response to the route setting request from the network central control section, and wherein the verifying section verifies whether or not the network central control section has performed desired route setting according to the route setting request, by referring to the connection data and the route indication data received by the target quasi switch.

(Supplementary Note 6)

A network central control system includes:

a network central control section configured to perform network central control; and a central control verifying section configured to verify the central control by the network central control section, wherein the central control verifying section includes:

a plurality of quasi switches respectively approximating a plurality of switches in the network;

a connection data managing section configured to manage connection data between the plurality of switches; and a verifying section, wherein each of the plurality of quasi switches is communicably connected to the network central control section through a control link, wherein a requesting quasi switch among the plurality of quasi switches transmits a route setting request to the network central control section;

the network central control section transmits route indication data to a target quasi switch among the plurality of quasi switches in response to the route setting request; and wherein the verifying section verifies whether or not the network central control section has performed desired route setting according to the route setting request, by referring to the connection data and the route indication data received by the target quasi switch.

(Supplementary Note 7)

A central control verification method of verifying network central control by a network central control section, includes:

providing a plurality of quasi switches respectively corresponding to a plurality of switches in a network, each of the plurality of quasi switches being communicably connected to the network central control section through a control link;

transmitting a route setting request from a requesting quasi switch among the plurality of quasi switches to the network central control section;

in response to the route setting request, transmitting route indication data from the network central control section to a target quasi switch among the plurality of quasi switches; and verifying whether or not the network central control section has performed desired route setting according to the route setting request, by referring to the connection data between the plurality of switches and the route indication data received by the target quasi switch.

This application claims a priority based on Japanese Patent Application No. 2010-138309 filed on Jun. 17, 2010, and entire disclosure thereof is incorporated herein by reference.

The invention claimed is:

1. A central control verifying apparatus, which verifies central control of a network by a network central controller, comprising:

a processor coupled with a memory;

a plurality of quasi switches respectively corresponding to a plurality of switches in the network;

a connection data managing program configured to manage connection data among said plurality of switches; and a verification program, wherein each of said plurality of quasi switches is communicably connected with said network central controller through a control link, wherein a requesting quasi switch of said plurality of quasi switches transmits a route setting request to said network central controller, wherein a target quasi switch of said plurality of quasi switches receives route indication data generated in response to the route setting request from said network central controller, and wherein said verifying program refers to the connection data and the route indication data received by said target quasi switch to verify whether or not a desired route setting is performed according to the route setting request by said network central controller.

2. The central control verifying apparatus according to claim 1, wherein said verifying program stops operations of said plurality of quasi switches when the desired route setting is not performed.

3. The central control verifying apparatus according to claim 1 or 2, wherein each of said plurality of quasi switches does not have a function of directly transferring a packet to another quasi switch of said plurality of quasi switches.

4. The central control verifying apparatus according to claim 3, further comprising an inter-switch transferring program,
wherein said plurality of quasi switches comprises:
a first quasi switch corresponding to a first switch of said plurality of switches; and
a second quasi switch corresponding to a second switch of said plurality of switches,
wherein said network central controller transmits an inter-switch connection verification packet for verifying a connection between said first switch and said second switch to said first quasi switch,
wherein said first quasi switch transfers the inter-switch connection verification packet to said inter-switch transferring program,
wherein said inter-switch transferring program refers to the connection data to rewrite header data of the inter-switch connection verification packet and outputs the inter-switch connection verification packet to said second quasi switch, and
wherein said second quasi switch transmits the inter-switch connection verification packet to said network central controller.

5. A non-transitory storage medium which stores a central control verification program to realize a central control verification function for verifying central control of a network by a network central controller on a computer,
wherein said central control verification function comprises:
a plurality of quasi switches respectively corresponding to a plurality of switches in said network;
a connection data managing program configured to manage connection data among said plurality of switches; and
a verifying program,
wherein each of said plurality of quasi switches is communicably connected with said network central controller through the control link,
wherein a requesting quasi switch of said plurality of quasi switches transmits a route setting request to said network central controller,
wherein a target quasi switch of said plurality of quasi switches receives route indication data generated in response to the route setting request, from said network central controller,
and
wherein said verifying program refers to the connection data and the route indication data received by said target quasi switch to verify whether or not a desired route setting is performed according to the route setting request by said network central controller.

6. A network central control system comprising:
a processor coupled with a memory;
a network central controller configured to carry out central control of a network; and
a central control verifying program configured to verify the central control by said network central controller,
wherein said central control verifying program comprises:
a plurality of quasi switches respectively corresponding to a plurality of switches in said network;
a connection data managing program configured to manage connection data among said plurality of switches; and
a verifying program,
wherein each of said plurality of quasi switches is communicably connected with said network central controller through a control link,
wherein a requesting quasi switch of said plurality of quasi switches transmits a route setting request to said network central controller,
wherein said network central controller transmits route indication data to a target quasi switch of said plurality of quasi switches in response to the route setting request, and
wherein said verifying program refers to the connection data and the route indication data received by said target quasi switch to verify whether or not a desired route setting according to the route setting request by said network central controller.

7. A method of verifying central control of a network by a network central control section, comprising:
providing a plurality of quasi switches respectively corresponding to a plurality of switches in said network, wherein each of said plurality of quasi switches is communicably connected with said network central control section through a control link;
transmitting a route setting request from a requesting quasi switch of said plurality of quasi switches to said network central control section;
transmitting route indication data from said network central control section to a target quasi switch of said plurality of quasi switches in response to the route setting request; and
referring to connection data between said plurality of switches and the route indication data received by said target quasi switch to verify whether or not a desired route setting according to the route setting request by said network central control section.

* * * * *